(No Model.) 2 Sheets—Sheet 1.
G. F. SIMONDS, Dec'd.
M. D. A., F. M. & W. A. SIMONDS, Executors.
BALL BEARING.
No. 539,090. Patented May 14, 1895.
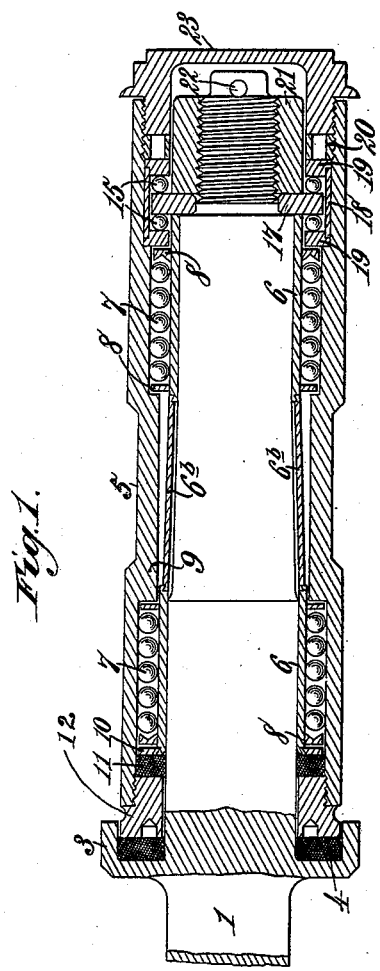
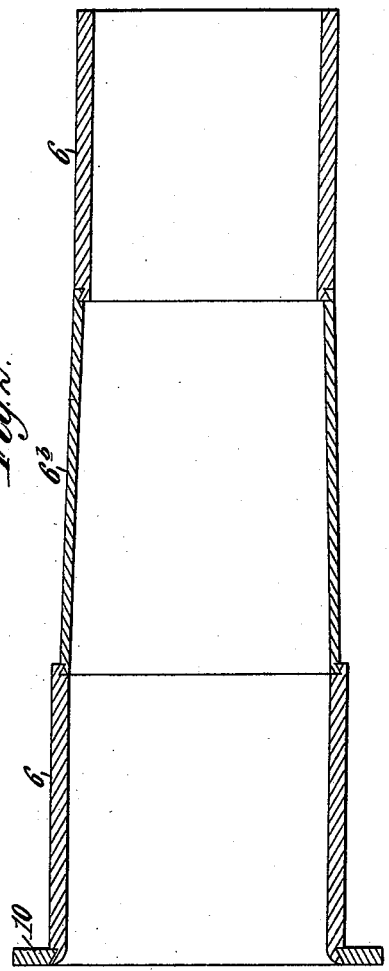
Witnesses.
Robert Everett.
Thos. A. Green
Inventor.
George F. Simonds.
By James L. Norris,
Atty.
THE NORRIS PETERS CO., PHOTO-LITHO., WASHINGTON, D. C.

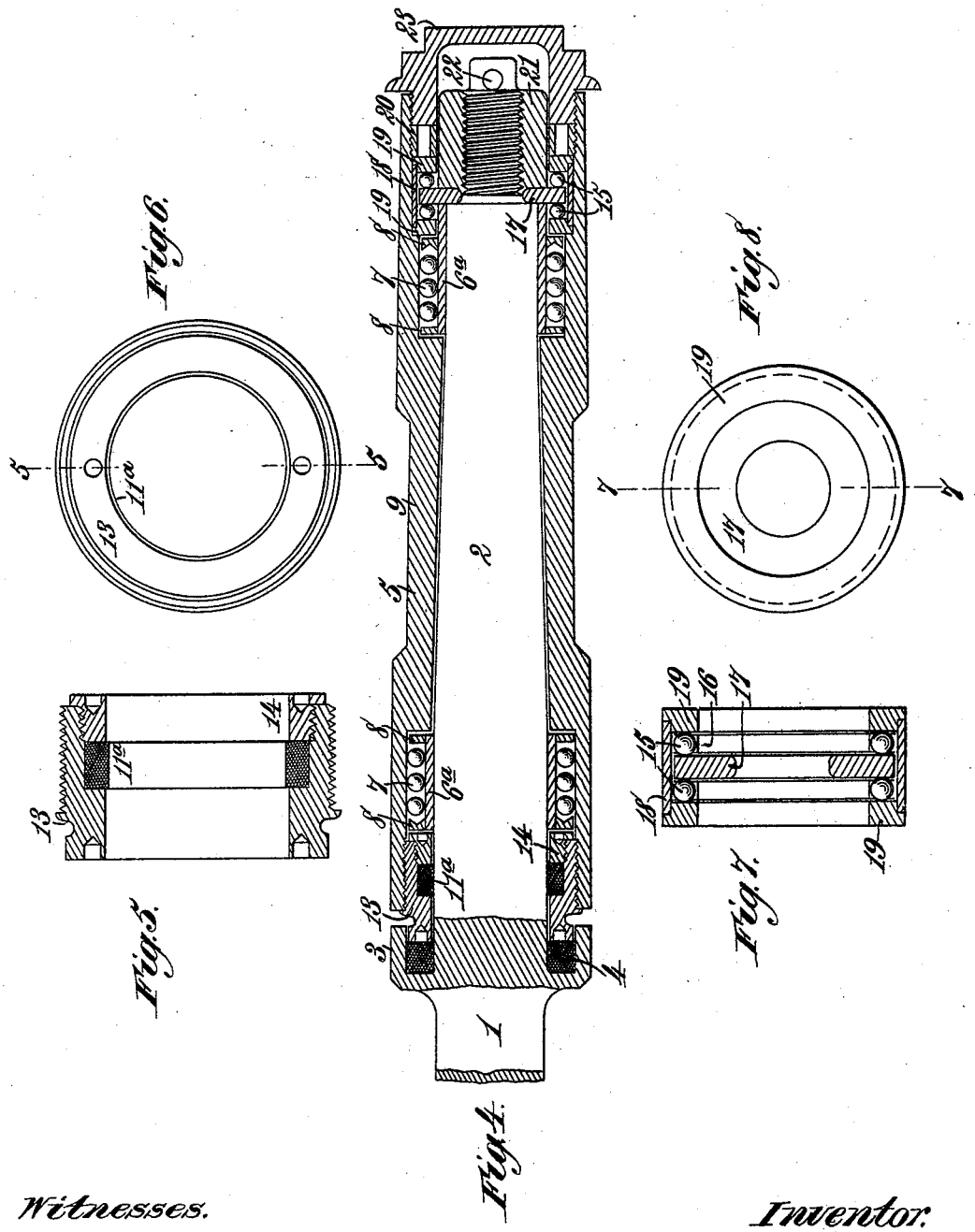

UNITED STATES PATENT OFFICE.

GEORGE F. SIMONDS, OF FITCHBURG, MASSACHUSETTS; MARY D. A. SIMONDS, FLORENCE M. SIMONDS, AND WALTER A. SIMONDS EXECUTORS OF SAID GEORGE F. SIMONDS, DECEASED.

BALL-BEARING.

SPECIFICATION forming part of Letters Patent No. 539,090, dated May 14, 1895.

Application filed August 9, 1894. Serial No. 519,842. (No model.)

*To all whom it may concern:*

Be it known that I, GEORGE F. SIMONDS, a citizen of the United States, residing at Fitchburg, in the county of Worcester and State of Massachusetts, have invented new and useful Improvements in Ball-Bearings, of which the following is a specification.

This invention relates to ball bearings especially adapted to resist end thrust and sustain radial pressure or weight in vehicle wheels and to thoroughly exclude dust, dirt, moisture or other foreign matter from the bearing.

The invention consists in the features of construction and novel combination of parts in a ball bearing as hereinafter more particularly described and claimed.

In the annexed drawings, illustrating the invention, Figure 1 is a longitudinal section of a carriage-axle ball-bearing embodying my improvements. Fig. 2 is an enlarged longitudinal section on the line 2 2, Fig. 3, of the axle-spindle sleeve. Fig. 3 is an elevation of the enlarged inner end of said sleeve. Fig. 4 is a longitudinal section of a carriage-axle ball-bearing, showing the employment of two disconnected axle-spindle sleeves and a modified arrangement of the packing at the inner end of the spindle. Fig. 5 is an enlarged longitudinal section on the line 5 5, Fig. 6, of two screw-rings and interposed packing to be inserted in the inner end of the hub-box. Fig. 6 is a side elevation of the same. Fig. 7 is a longitudinal section on the line 7 7, Fig. 8, of the end-thrust ball-bearings, with their cages, interposed axle-ring, and inclosing-case. Fig. 8 is a side elevation of said end-thrust case and inclosed parts.

In Figs. 1 and 4, the reference numeral 1 designates a portion of a carriage or wagon axle and 2 the axle spindle. The spindle 2 may be tapered, as usual, and at its inner end is a fixed annular collar or shoulder 3 having its outer face formed with an annular recess in which is placed a packing ring 4 of any suitable material, preferably elastic.

The hub box 5, which may be made of suitably hardened metal, is internally screw-threaded at its opposite ends and surrounds one or more hardened steel sleeves 6, Figs. 1 and 2, or $6^a$, Fig. 4, that fit closely onto the axle spindle. The sleeves on the opposite end portions of the spindle are of unequal diameter, corresponding to the differences in diameter at the opposite ends of the tapered spindle.

Between the hub box 5 and sleeves 6 or $6^a$ are placed annular series of spherical rollers or balls 7 that are confined in cages 8 and arranged to revolve freely in all directions in contact with the concentric surfaces of the bearing in such manner as to sustain radial pressure or weight, reduce the friction to a minimum and render the bearing practically noiseless. The concentric bearing surfaces for the balls 7 are formed by the hub box 5 and the hardened sleeves 6 or $6^a$, as the case may be. In order to receive and accommodate the ball bearing cages the hub box 5 is provided in its opposite ends with annular recesses or chambers separated from each other by an inner laterally extended annular projection 9, as shown.

If desired the hardened steel sleeves 6, Figs. 1 and 2, may be rigidly connected by a somewhat tapered sleeve $6^b$ which need not be hardened as it is not subjected to any friction. These sleeves 6 and $6^b$ may be securely connected by dovetail or rabbet joints, as shown, or in any other suitable manner, and will all together form a single continuous sleeve that practically incloses the axle spindle and is stationary thereon.

As shown in Figs. 2 and 3 the larger inner end of the spindle sleeve may be provided with a collar or annular flange 10 to form an abutment for a packing ring 11 composed of any suitable material, preferably elastic, and adapted to surround the axle spindle 2, as shown in Fig. 1, to assist in excluding dirt and moisture. After the caged balls at the inner end of the bearing have been placed in position between the hub-box and axle spindle sleeve the packing ring 11 will be inserted and is secured in place by means of an externally shouldered and screw threaded ring 12 screwed into the internally screw threaded inner end of the hub box.

In Figs. 4, 5 and 6 is shown a modification in the arrangement of the packing at the inner end of the bearing. A packing ring 11ª, in this case, is clamped between two screw threaded rings 13 and 14 and inserted together therewith, or all in a body, into the bearing. The larger and outer ring 13 is internally shouldered and recessed to receive the packing ring 11ª which is held in place by a smaller ring 14 screwed into one end of the outer ring; the latter being externally screw threaded for engagement in one end of the hub box, as shown.

Should it be desired to provide means for resisting end thrust annular series of spherical rollers or balls 15 may be arranged to revolve in contact with parallel plane surfaces in the outer end of the bearing. As shown in Figs. 1, 4 and 7, the end thrust balls 15 are confined in two annular cages 16 held apart by an intermediate axle ring 17 and inclosed therewith in an end thrust case 18 closed by rings 19 at its opposite ends or sides. The end thrust case 18, together with its contents, is inserted into the internally shouldered and recessed outer end of the hub box 5, as shown in Figs. 1 and 4, and is secured therein by means of a ring 20 screwed into the hub box. The rings 12, or 13, and 20 may be readily screwed into or removed from the opposite ends of the hub-box by the aid of a spanner. When the hub box 5 and inclosed ball bearings have been placed onto the axle spindle and secured by the nut 21, cotter pin 22 and screw cap 23 the axle ring 17 will abut tightly against the end of the spindle and its sleeve and will co-act with the rings 19 to form parallel plane surfaces for the balls 15 to roll against in resisting end thrust. At the same time the radial thrust or weight of the bearing will be sustained by the annular series of balls 7 caged between the hub box and the hardened sleeve or sleeves of the axle spindle.

In order to take off the wheel it is only necessary to unscrew the cap 23, knock out the cotter pin 22 and remove the nut 21 when the hub will slide easily from the axle together with all the working parts of the bearing which will remain in and come off with the hub. For the purpose of taking apart the bearing the rings in the ends of the hub box will be removed by means of a spanner and the cages of the different sets of balls can then be readily taken out. In putting the bearing together the ring 20 should be screwed up firmly against the end thrust case. The bearing requires but moderate oiling and that only at long intervals of time. There are no parts liable to become disarranged or worn; and as the friction is evenly distributed and almost entirely removed the liability of hot boxes is eliminated.

What I claim as my invention is—

1. In a ball bearing, the combination of the axle spindle having at its inner end a fixed collar the outer face of which is provided with an annular recess, packing inserted in said recess, the hub box having in its opposite ends annular recesses or chambers separated from each other by an inner laterally extended annular projection, annular series of caged balls placed in said recesses of the hub box and surrounding the axle spindle to sustain radial pressure, packing arranged in the inner end of the hub box and surrounding the axle spindle, a ring screwed into the inner end of the hub box to hold said packing in place and adapted to abut also against the packing in the annular recess of the fixed collar on the axle spindle, and annular series of balls arranged in the outer end of the hub box to resist end thrust, substantially as described.

2. In a ball bearing, the combination of the axle spindle provided with the fixed collar having an annular recess in its outer face, packing inserted in said recess, a sleeve surrounding the axle spindle and provided with an annular flange on its inner end, the hub box having chambered ends, annular series of caged balls placed in the chambered ends of the hub box and surrounding the axle spindle to sustain radial pressure, packing arranged in the inner end of the hub box and surrounding the axle spindle at the inner flanged end of the axle spindle sleeve, a ring screwed into the inner end of the hub box to hold said packing in place and abut also against the packing in the annular recess of the fixed collar on the axle spindle, and annular series of balls placed in the outer end of the hub box to resist end thrust, substantially as described.

In testimony whereof I have hereunto set my hand in presence of two subscribing witnesses.

GEORGE F. SIMONDS.

Witnesses:
 JOSEPH WARREN,
 ELMER P. HOWE.